United States Patent Office 3,561,291
Patented Feb. 9, 1971

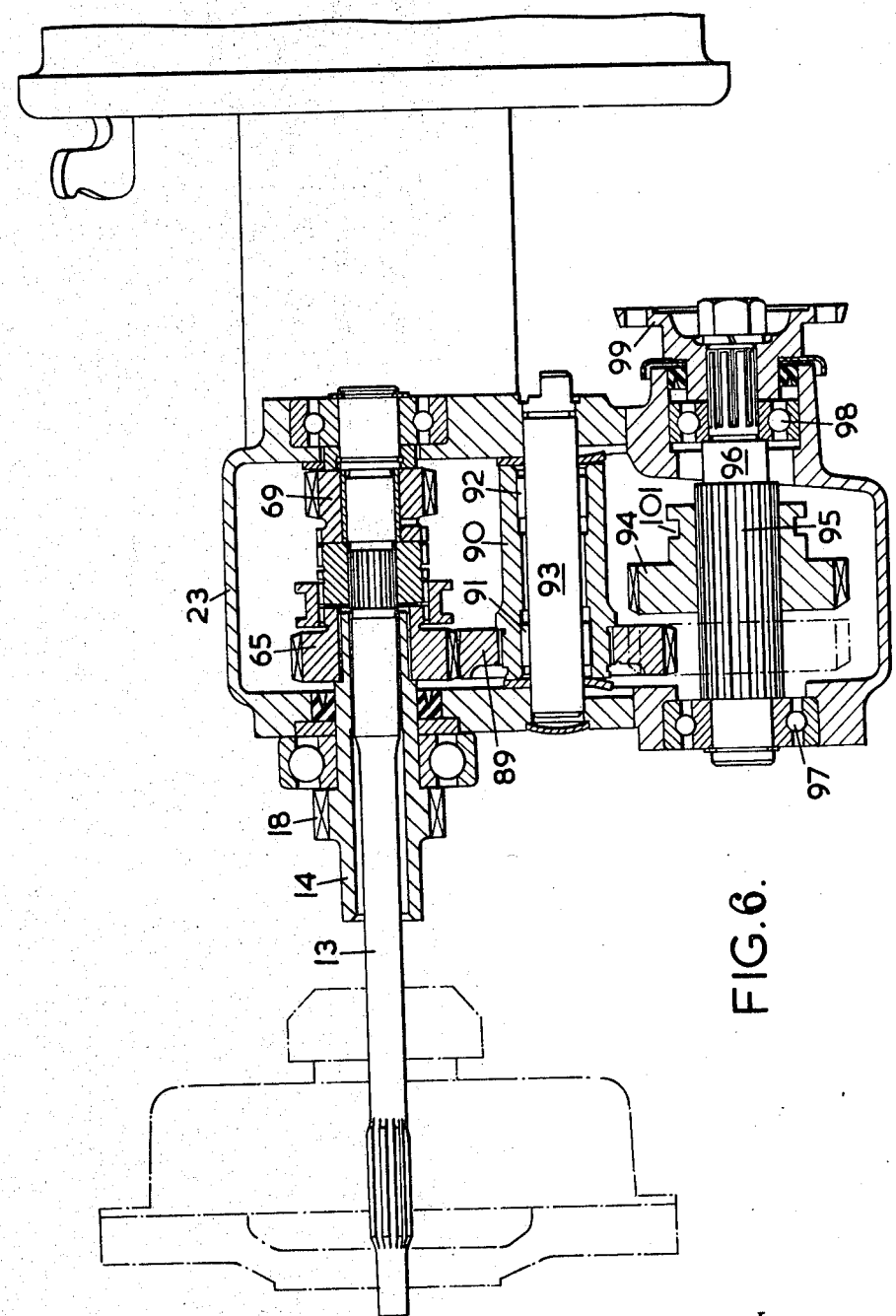

3,561,291
TRANSMISSION UNIT FOR A MOTOR VEHICLE
Henry George Webster, George Arthur Jones, and John Payne, Canley, Coventry, England, assignors to The Standard Triumph Motor Company Limited, Coventry, England
Filed June 19, 1969, Ser. No. 834,645
Claims priority, application Great Britain, June 25, 1968, 30,153/68
Int. Cl. F16h 37/06, 3/44, 57/10
U.S. Cl. 74—740
12 Claims

ABSTRACT OF THE DISCLOSURE

A transmission unit for a motor vehicle has a power input shaft, a coaxial driving gear connected to drive a parrallelly spaced power input gear of a main change-speed gearing, and the power input shaft is connected to the driving gear by an auxiliary change-speed gearing having power input and power output members coaxial with the driving gear.

---

The invention relates to a transmission unit, for a motor vehicle and is concerned with an improvement in or modification of the inventions claimed and described in our British Pats. Nos. 1,084,452 and 1,084,453.

According to the invention of our British Pat. No. 1,084,453, a propulsion plant, for a motor road vehicle, has a change-speed gearing and a differential gearing, for driving a pair of independently-supported road wheels, supported from a reciprocating-type internal combustion engine such that the differential gearing is below the engine crankshaft, a disengageable coupling is adapted to connect the engine to drive a power transmission shaft coaxial with the engine crankshaft and drivingly connected to a driving gear, the change-speed gearing has a layshaft with layshaft gears for selectively driving respective complementary gears on a mainshaft which is connected to drive the power input member of the differential gearing, the mainshaft is supported by two axially spaced bearings and a power input gear for the change-speed gearing is journalled on the mainshaft between said bearings to mesh with one of said layshaft gears and is arranged to be driven from the transmission shaft by said driving gear which is arranged in a housing that is fast with the housing of the change-speed gearing.

According to the invention of our British Pat. No. 1,084,452, a transmission unit particularly, but no exclusively, for use in a propulsion plant as described and claimed in our British Pat. No. 1,084,453, includes a change-speed gearing having a layshaft and an associated mainshaft which is supported in a pair of axially-spaced journal bearings, a disengageable coupling having a power input member for connection to the crankshaft of the vehicle engine and a power output member having a driving gear, the axes of the layshaft and mainshaft being parallel to and spaced from the axis of rotation of the disengageable coupling, the driving gear being arranged to drive a power input gear for the change-speed gearing through an intermediate idler gear, which power input gear is arranged between the said mainshaft journal bearings.

If the aforesaid change-speed gearing is a main change-speed gearing difficulties arise when an attempt is made to add an auxiliary change-speed gearing, for example an overdrive, in series with the main change-speed gearing. An object of the present invention is to mitigate such difficulties.

According to the present invention, a transmission unit for a motor vehicle includes a power input shaft arranged for being drivingly connected to an engine by a disengageable coupling, a driving gear coaxially surrounding and connected to be driven by the power unit input shaft, the driving gear connected to drive a power input gear of a main change-speed gearing of which the axis is parallelly-spaced from the axis of the driving gear, and the power input member is connected to the driving gear by an auxiliary change-speed gearing having a power input member coaxially connected to the power input shaft and a power output member coaxially connected to the driving gear. According to a feature of the invention the auxiliary change-speed gearing may be an epicyclic gearing.

According to another feature the epicyclic gearing may include a first rotary element, resilient means acting between the first rotary element and a friction engaging clutch means whereby to engage the latter to connect the first rotary element to a second rotary element to effect a direct drive through the epicyclic gearing, and a fluid pressure operable piston and cylinder means coaxial with the epicyclic gearing and arranged when operated to disengage the friction engaging clutch means against the bias of the resilient means and to urge the first rotary element towards a stationary part of the epicyclic gearing whereby a friction engaging braking means between the first rotary element and the stationary part will bring the rotary element to rest to effect an indirect drive ratio through the epicyclic gearing.

According to yet another feature the auxiliary change-speed gearing may be a layshaft gearing. According to a further feature the auxiliary change-speed gearing may be arranged to provide optionally a direct drive ratio or an overdrive ratio.

According to another feature the auxiliary change-speed gearing may be arranged to provide optionally a direct drive ratio or a reduction ratio.

According to yet another feature a power output means of the said main change-speed gearing may be permanently connected to drive a first pair of vehicle road wheels and coupling means is provided to connect the said power output means optionally to drive a second pair of vehicle road wheels. Preferably the transmission unit includes means adapted to engage the said coupling means for transmitting drive to the second pair of wheels whenever the lowest of the drive ratios provided by the auxiliary change-speed gearing is engaged, that is when the lowest wheel speed is obtained for a given engine speed.

According to a further feature of the invention the main change-speed gearing may be a layshaft gearing.

According to another feature the transmission unit may include a power-take-off unit of which an output shaft is arranged to be optionally drivably connectable to a driven rotary element of the auxiliary change-speed gearing. Preferably the power-take-off unit output shaft is connected to be driven by the power output member of the auxiliary change-speed gearing constituting the driven rotary element whereby the speed ratio of the engine to the power-take-off unit output shaft may be optionally varied by the auxiliary change-speed gearing.

The invention is described, by way of example only, with reference to the accompanying drawings, in which:

FIG. 6 is a section along the line 6—6 in FIG. 4.

Figure 1:
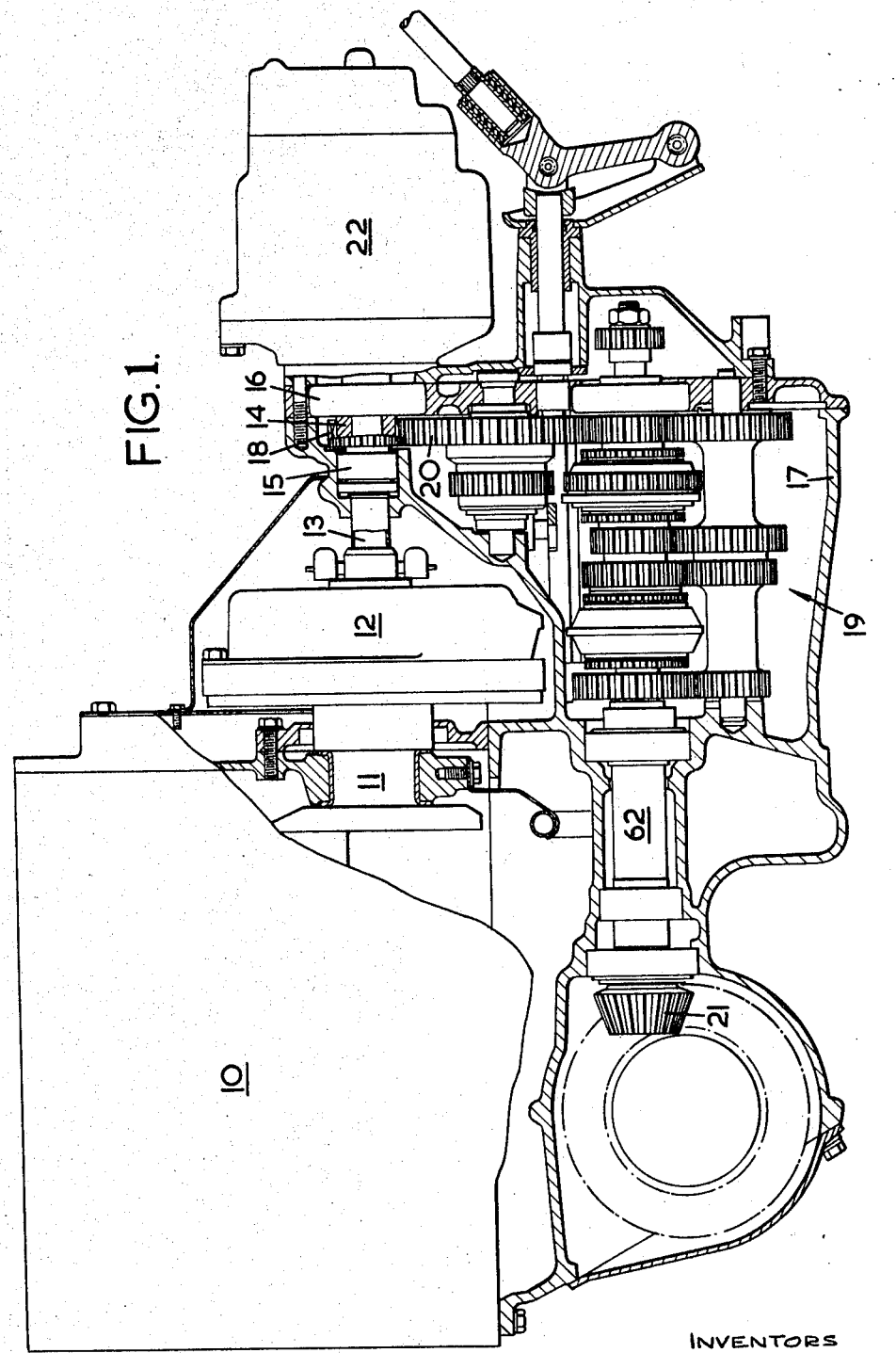
FIG. 1 is a part section in a vertical plane of a transmission according to the invention.

An internal combustion piston engine 10 having a crankshaft 11 drives a friction clutch 12 of which the output drives a power input shaft 13 which is surrounded by a coaxial sleeve 14 supported in bearings 15, 16 from a main transmission casing 17. The outside of the sleeve 14 is formed as a spur driving gear 18 which drives a main synchromesh layshaft change-speed gearing 19, of well known kind, through an idler gear 20. The axes of the driving gear 18, the idler gear 20 and the mainshaft and layshaft of the main gearing 19 are all parallely spaced apart. The main gearing 19 drives a crown wheel and pinion 21 which are connected to drive a pair of vehicle road wheels.

Figure 2:
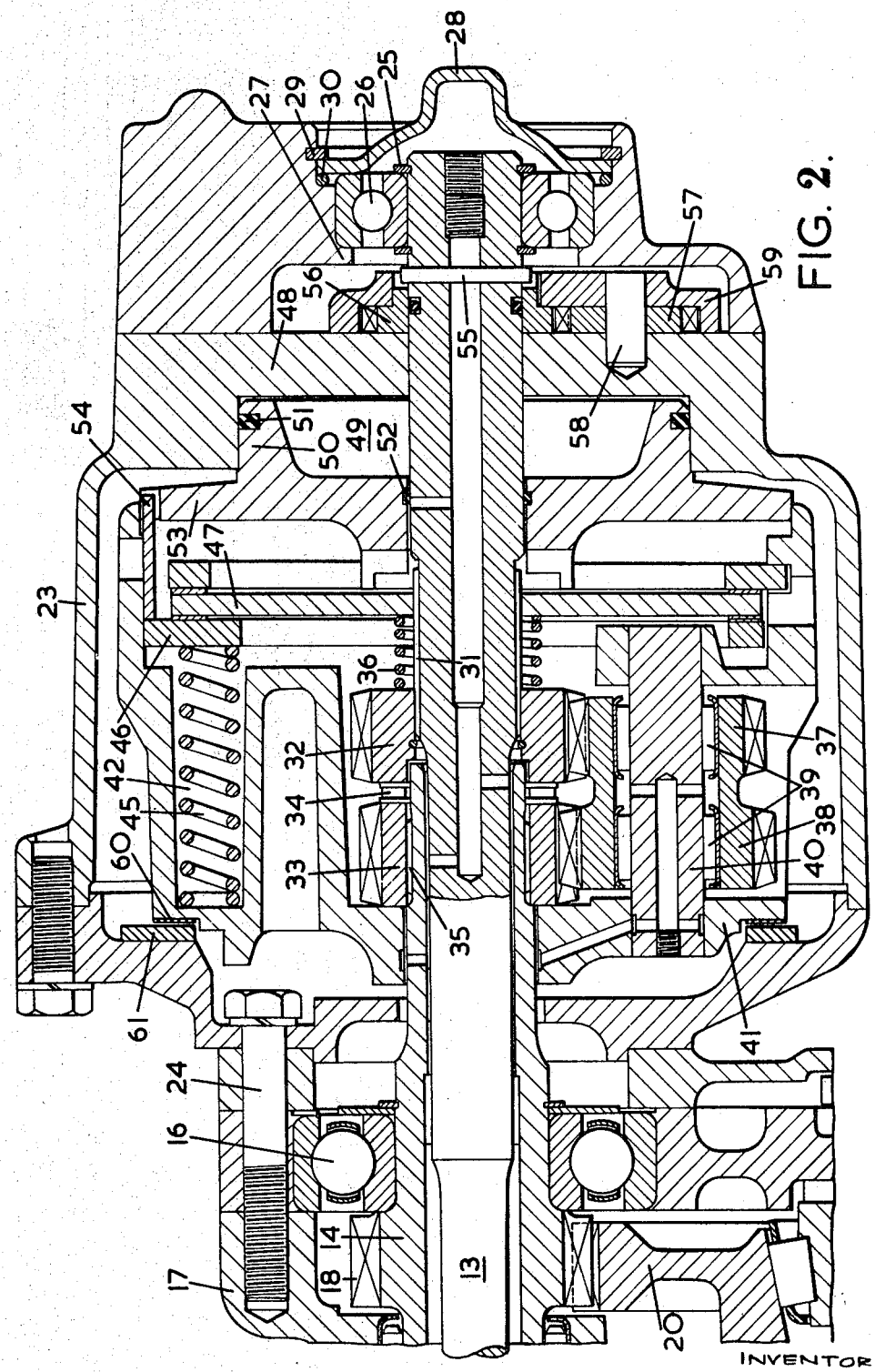
FIG. 2 is a section in a vertical plane of an epicyclic auxiliary change-speed gearing shown in FIG. 1.
Figure 3:
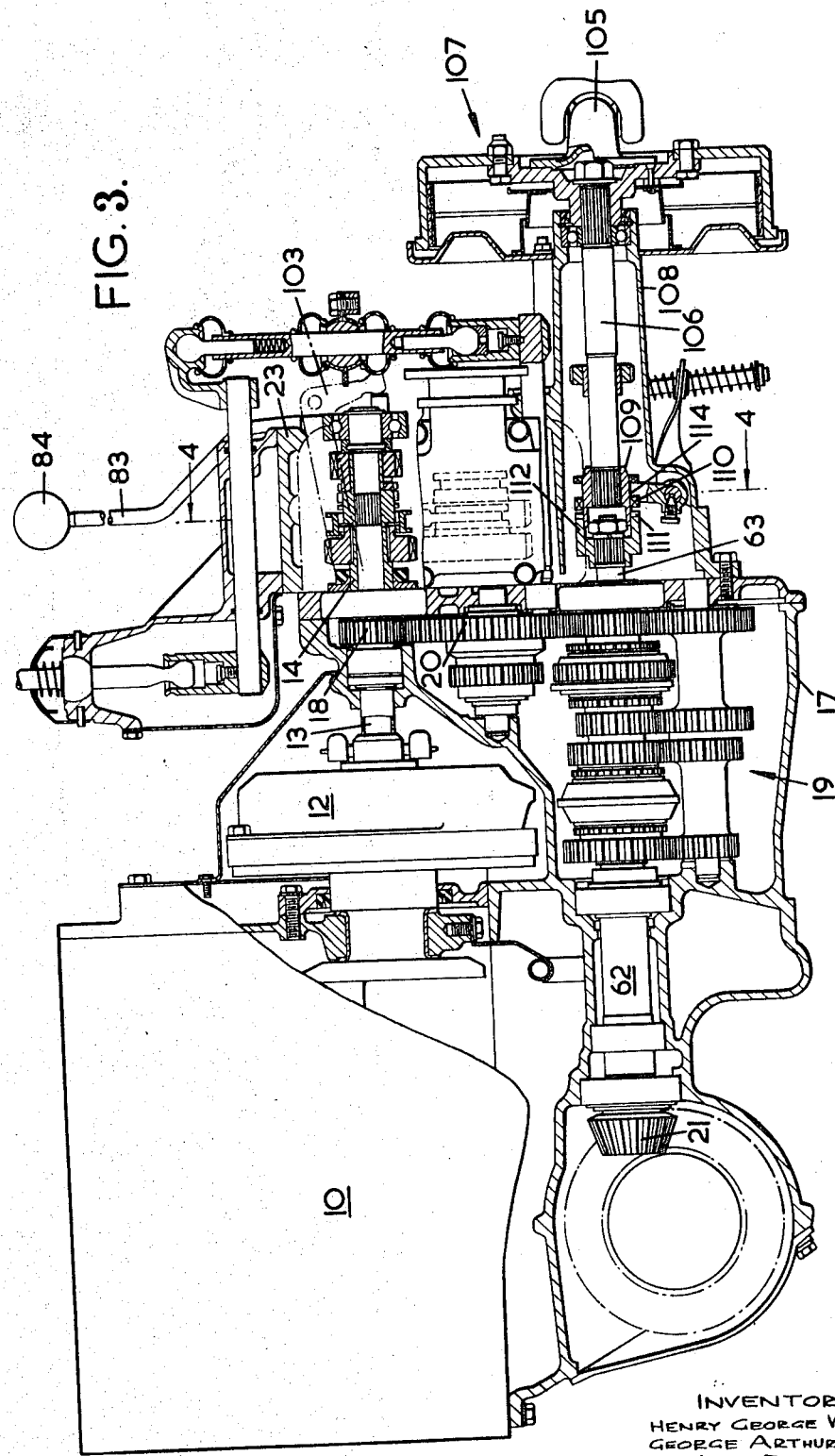
FIG. 3 is a section in a vertical plane of an alternative embodiment of the invention.
Figure 4:
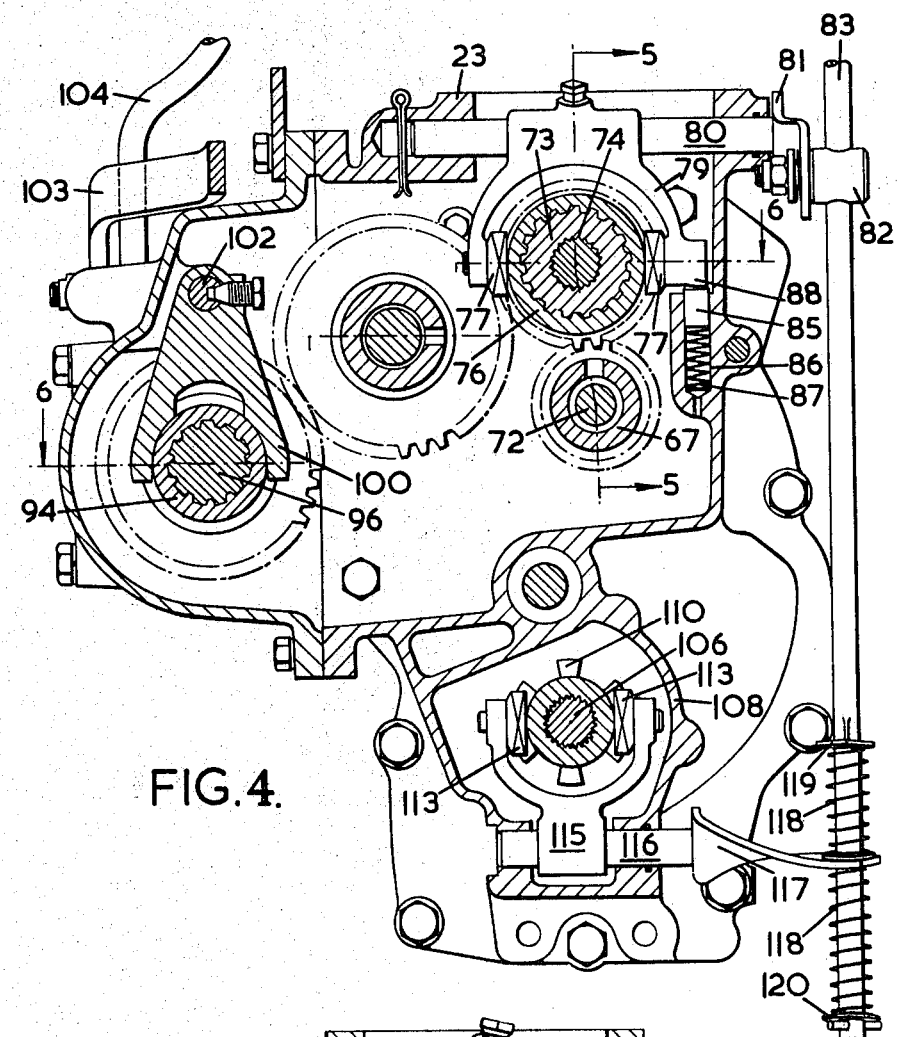
FIG. 4 is a transverse section along the line 4—4 in FIG. 3.
Figure 5:
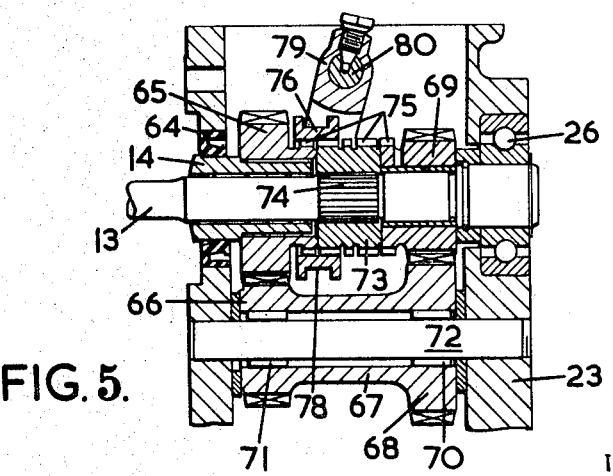
FIG. 5 is a section along the line 5—5 in FIG. 4.

In the embodiment disclosed in FIGS. 1 and 2 the connection between the power input shaft 13 and the driving gear 18 is made by an epicyclic auxiliary change-speed gearing 22 which is arranged to provide optionally selectable overdrive and direct drive ratios.

The auxiliary gearing is contained in a casing 23 which is fastened at one end to the main transmission casing 17 by screws 24. The power input shaft 13 is supported between circlips 25 by a bearing 26 in the other end of the casing 23. The bearing 26 is located between a shoulder 27 and a closure cap 28 which is held by a circlip 29 and sealed by an O-ring 30.

External splines 31 on the shaft 13 drivingly connect with corresponding splines in a coaxial bore in a first sun gear 32 which is separated from a coaxial second sun gear 33 by a needle roller thrust bearing 34. The second sun gear 33 is supported on the sleeve 14 and drivingly connected thereto by splines 35. A light spring 36 holds the sun gears axially together. The first and second sun gears 32, 33 mesh with respective first and second planet gears 37, 38 which are integral, coaxial and supported by needle roller bearings 39 on a pin 40 held fast in a planet carrier 41. There are preferably three identical sets of such planet gears and planet pins of which only one is shown.

In axially directed pockets 42, intermediate the planet gear sets, three identical helically coiled compression springs 45 act between the planet carrier 41 and a pressure plate 46 of a friction-engaging clutch of which a driven plate 47 is splined to the shaft 13. The pressure plate 46 is engaged by splines to the planet carrier 41 so that the springs 45 clamp the pressure plate 46 to the driven plate 47 to lock the epicyclic gearing in direct drive ratio.

A diaphragm wall 48 of casing 23 is formed as a fluid cylinder 49 coaxial with the shaft 13. A fluid pressure operable piston 50 in the cylinder 49 is sealed by O-rings 51, 52 and has a radially extending flange 53 against which one end of a strut 54 abuts. The other end of the strut 54 abuts the pressure plate 46. A pin 55 fast in a diametral bore in the shaft 13 drivingly engages a gear 56 of a gear pump of which the other meshing gear 57 is mounted on a pin 58 in a pump housing 59. The lower part of the overdrive casing forms a sump from which the pump draws oil for lubrication and operation of the overdrive.

To change from direct drive ratio to overdrive ratio an unseen valve of any suitable type, which will be well known to those versed in the art, is opened to admit pressurised operating fluid from the pump to the cylinder 49. The piston 50 is moved to the left and, through the strut 54 pushes the pressure plate 46 to the left, against the bias of the springs 45, thereby freeing the clutch driven plate 47. At the same time the piston force moves the planet carrier 41 to the left until an annular friction lining 60 fast with the planet carrier 41 is brought into engagement with a brake ring 61 fast with the overdrive casing 23, thereby bringing the planet carrier 41 to rest and engaging overdrive ratio. For lubrication of the gears and bearings of the overdrive, oil from the pump is fed through interconnecting axial and radial bores in the shaft 13, sleeve 14, planet carrier 41 and planet pins 40.

In the embodiment of the invention shown in FIGS. 3 to 6 the engine 10, power input shaft 13, sleeve 14, driving gear 18, idler gear 20 and main change-speed gearing 19 are substantially as in the embodiment shown in FIGS. 1 and 2. The shaft 62 connecting the main gearing 19 to the final drive pinion 21 has a rearwards extension 63 for driving another pair of wheels in a manner to be described later.

As before the shaft 13 is carried in a bearing 26 at the rear of the auxiliary change-speed gearing casing 23. In this embodiment the auxiliary change-speed gearing is a layshaft gearing providing optionally a direct drive ratio and a reduction or underdrive ratio. The sleeve 14 is sealed from the casing 23 by an oil seal 64, and is externally splined to drivingly support a coaxial first auxiliary gear 65. The gear 65 meshes with a second auxiliary gear 66 which is integral with one end of a layshaft 67 at the other end of which is formed an integral third auxiliary gear 68 meshing with a fourth auxiliary gear 69 which is carried coaxially by a bearing on the shaft 13. The layshaft 67 is supported by needle roller bearings 70, 71 on a bar 72 fast in bores in the ends of the casing 23, which is fastened by screws to the main change-speed gearing casing 17.

Positioned axially intermediate the auxiliary gears 65 and 69 is a coaxial member 73 drivingly carried on the shaft 13 by splines 74. The outside surface of the member 73 and corresponding adjacent portions of the gears 65 and 69 are formed with identical driving dogs 75. An axially slidable connecting collar 76 is formed with corresponding internal dogs which are permanently meshed with the dogs 75 on the member 73. The collar 76 is movable from a forward position where it engages the dogs on the member 73 and on the first auxiliary gear 65 to a rearwards position where it engages the dogs on the member 73 and on the fourth auxiliary gear 69, through an intermediate neutral position where it engages the dogs on either gear 65 or 69. In the forward position the collar 76 drivingly connects the shaft 13 directly to the sleeve 14 whereby the auxiliary change-speed gearing will operate at a direct drive ratio. In the rearwards position the collar 76 drivingly connects the shaft 13 to the sleeve 14 through the reduction gear train 69, 68, 66, 65 whereby the auxiliary change-speed gearing will operate at the reduction drive ratio.

Axial movement of the collar 76 is effected by two thrust pads 77 each engaged in a groove 78 in the periphery of the collar 76 and each pivoted in the tip of a selector fork 79 fast on a transverse shaft 80 pivoted in bores in the casing 23. One end of the shaft 80 is fast with a lever 81 which is pivoted to a boss 82 fast on an auxiliary gear-change operating rod 83 having an operating knob 84 at its upper end. The collar 76 is held in each of its operating positions by a plunger 85 in a vertical bore 86 in the casing 23. The plunger 85 is urged by a compression spring 87 against a detent-profiled portion 88 of selector fork 79.

This embodiment of the invention is adapted to provide an optionally engageable power-take-off drive for external machinery. The power-take-off comprises a fifth auxiliary gear 89 fast with a sleeve 90 supported by bearings 91, 92 on a bar 93 held in bores in the casing 23. The gear 89 meshes with the first auxiliary gear 65. A sixth auxiliary gear 94 is slidably and drivingly mounted on splines 95 formed on a power output shaft 96 which is carried by bearings 97, 98 in the casing 23 and which is connected by splines to an output driving flange 99 in well known manner. The flange 99 is driven when the gear 94 is slid axially forward into engagement with the gear 89 by a selector fork 100 engaged in a groove 101 in the gear 94 and fast with an axially slidable selector rod 102 carried in a bore in the casing 23 and moved by a bell crank lever 103 pivoted to the casing 23 and operated by a power-take-off selecting lever 104.

This embodiment is also adapted to provide an optionally selectable drive to an additional pair of vehicle road wheels connected to be driven through a universal joint 105 and a shaft 106 which also carries a transmission brake 107 of known kind. The shaft 106 is carried in a housing 108 forming part of the casing 23. The forward end of the shaft 106 has axially directed splines which drivably support an axially slidable member 109 formed with dogs 110 which can be slid into engagement with corresponding dogs 111 formed on a sleeve 112 fast with the extension 63 of the shaft 62. The front end of the shaft 106 is supported by a cylindrical extension of the axially slidable member 109 engaged inside a cylindrical surface of the sleeve 112.

Axial movement of the member 109 for engagement and disengagement of drive to the rear wheels is effected by two thrust pads 113 engaged in a peripheral slot 114 in the member 109 and each pivoted in the tip of a selector fork 115 which is fast on a shaft 116 pivoted in a transverse bore in the casing 108. A lever 117 fast on one end of the shaft 116 has a clearance hole through which passes an extension of the auxiliary gearing operating rod 83. A pair of precompressed helical compression springs 118 act between abutments 119, 120 on the rod 83 and in opposite directions on the lever 117 whereby to centralise the lever 117 between the abutments 119, 120. When the rod 83 is pulled upwards to engage the reduction ratio of the auxiliary change-speed gearing, the lower spring 118 is further compressed and urges the lever 117 upward to engage the drive to the rear wheels. The spring arrangement enables the engagement of rear wheel drive to occur subsequently to the engagement of the reduction ratio, if the dogs 110, 111 are not correctly aligned.

Although, in these embodiments, the main change-speed gearing has been described as layshaft gearing, the invention is equally applicable to other types of main change-speed gearing such as epicyclic gearing. Furthermore, in some cases the idler gear 20 may be omitted and the driving gear 18 may mesh directly with a gear of the main gearing. In some cases the drive from the sleeve 14 to the main gearing may be effected by a chain drive engaging a sprocket in lieu of the driving gear 18 and the term "gear" must be taken to include the term "sprocket" in this context.

What we claim as our invention and desire to secure by Letters Patent of the United States is:

1. A transmission unit for a motor vehicle, including a power input shaft drivingly connected to an engine by a disengageable coupling, a driving gear coaxially surrounding and connected to be driven by the power input shaft, the driving gear being connected to drive a power input gear of a main change-speed gearing, the axis of the power input gear being parallelly spaced from the axis of the driving gear, wherein the improvement comprises that the power input shaft is connected to the driving gear by an auxiliary change-speed gearing having a power input member coaxially connected to the power input shaft and a power output member coaxially connected to the driving gear.

2. A transmission unit, as in claim 1, in which the auxiliary change-speed gearing is an epicyclic gearing.

3. A transmission unit, as in claim 2, in which the epicyclic gearing includes a first rotary element, resilient means acting between the first rotary element and a friction engaging clutch means whereby to engage the latter to connect the first rotary element to a second rotary element to effect a direct drive through the epicyclic gearing, and a fluid pressure operable piston and cylinder means coaxial with the epicyclic gearing and arranged when operated to disengage the friction engaging clutch means against the bias of the resilient means and to urge the first rotary element towards a stationary part of the epicyclic gearing whereby a friction engaging braking means between the first rotary element and the stationary part will bring the rotary element to rest to effect an indirect drive ratio through the epicyclic gearing.

4. A transmission unit, as in claim 2, in which the auxiliary change-speed gearing includes a direct drive ratio and an optional overdrive ratio.

5. A transmission unit, as in claim 2, in which the auxiliary change-speed gearing includes a direct drive ratio and an optional reduction ratio.

6. A transmission unit, as in claim 1, in which the auxiliary change-speed gearing is a layshaft gearing.

7. A transmission unit, as in claim 6, in which the auxiliary change-speed gearing includes a direct drive ratio and an optional overdrive ratio.

8. A transmission unit, as in claim 6, in which the auxiliary change-speed gearing includes a direct drive ratio and an optional reduction ratio.

9. A transmission unit as in claim 6 in which the auxiliary change-speed gearing includes a second power output member optionally drivable at a rotational speed to be varied by the auxiliary change-speed gearing.

10. A transmission unit, as in claim 1, in which said main change-speed gearing includes a first power output means, a second power output means and coupling means effective to engage said second power output means with said first power output means.

11. A transmission unit, as in claim 10, including means adapted to engage the said coupling means for transmitting drive to said second power output means whenever the lowest of the drive ratios provided by the auxiliary change-speed gearing is engaged.

12. A transmission unit, as in claim 1, in which the main change-speed gearing is a layshaft gearing.

References Cited

UNITED STATES PATENTS

| | | | |
|---|---|---|---|
| 2,536,737 | 1/1951 | Gerst | 74—745X |
| 2,285,760 | 6/1942 | Thompson | 74—789X |
| 2,838,940 | 6/1958 | Swenson et al. | 74—740X |
| 3,229,551 | 1/1966 | Stuckey | 74—745 |
| 3,396,610 | 8/1968 | Rich, Jr., et al. | 74—740 |
| 3,487,724 | 1/1970 | McIntyre et al. | 74—740 |

LEONARD H. GERIN, Primary Examiner

U.S. Cl. X.R.

74—745, 789